United States Patent
Diaz de Leon Miranda et al.

(10) Patent No.: US 11,394,300 B2
(45) Date of Patent: Jul. 19, 2022

(54) POWER SUPPLY

(71) Applicant: Casco Products Corporation, Wallingford, CT (US)

(72) Inventors: Carlos Daniel Diaz de Leon Miranda, Detroit, MI (US); Benyu Zou, Northville, MI (US); Joshua Frederick Hartwig, Novi, MI (US); Chieh-Kai Chang, Grosse Pointe Woods, MI (US); Gary Lee Firman, II, White Lake, MI (US); William Awad, Canton, MI (US)

(73) Assignee: CASCO PRODUCTS CORPORATION, Wallingford, CT (US)

( * ) Notice: Subject to any disclaimer, the term of this patent is extended or adjusted under 35 U.S.C. 154(b) by 0 days.

(21) Appl. No.: 17/338,888

(22) Filed: Jun. 4, 2021

(65) Prior Publication Data

US 2021/0384831 A1    Dec. 9, 2021

Related U.S. Application Data

(60) Provisional application No. 63/035,293, filed on Jun. 5, 2020.

(51) Int. Cl.
*H02J 7/00* (2006.01)
*B60L 11/18* (2006.01)
(Continued)

(52) U.S. Cl.
CPC .............. *H02M 3/158* (2013.01); *B60L 1/006* (2013.01); *B60R 16/03* (2013.01); *F02N 11/0822* (2013.01); *F02N 11/0862* (2013.01); *H02M 1/32* (2013.01); *H02M 1/44* (2013.01); *B60L 2210/14* (2013.01); *B60L 2210/40* (2013.01); *F02N 2011/0888* (2013.01)

(58) Field of Classification Search
CPC ........ H02M 1/44; H02M 3/158; H02M 1/008; H02M 1/14; H02M 1/32; F02N 11/0822; F02N 11/04; F02N 2200/0809; F02N 2011/0888; F02N 11/0862; B60L 1/006; B60L 2210/40; B60L 2210/14; B60R 16/03

See application file for complete search history.

(56) References Cited

U.S. PATENT DOCUMENTS 9,511,676 B2 * 12/2016 Loftus ..................... B60L 53/16
2012/0316749 A1 * 12/2012 Ubukata ............. F02N 11/0866
701/102

(Continued)

*Primary Examiner* — Jared Fureman
*Assistant Examiner* — Esayas G Yeshaw
(74) *Attorney, Agent, or Firm* — Ostrolenk Faber LLP

(57) ABSTRACT

A power supply and an automotive topology that includes the power supply, the power supply having an integrated module, which includes in a common, shared module housing, a start-stop DC/DC converter, a DC/AC converter, and an auxiliary DC/DC converter, which bypasses stop/start during non-stop/start operation. A DC input port connected to the start-stop DC/DC converter, DC/AC converter, and the auxiliary DC/DC converter. A DC output port connected to the start-stop DC/DC converter to supply DC to critical loads of a motor vehicle, even during vehicle OFF mode. An AC output port connected to the DC/AC converter to supply AC to an external component.

22 Claims, 8 Drawing Sheets

(51) Int. Cl.
*H02M 3/158* (2006.01)
*H02M 1/32* (2007.01)
*H02M 1/44* (2007.01)
*B60R 16/03* (2006.01)
*F02N 11/08* (2006.01)
*B60L 1/00* (2006.01)

(56) References Cited

U.S. PATENT DOCUMENTS

| | | | |
|---|---|---|---|
| 2015/0054337 A1* | 2/2015 | Ogale | B60L 15/007 |
| | | | 307/10.1 |
| 2017/0234285 A1* | 8/2017 | Huh | B60K 6/26 |
| | | | 123/179.4 |
| 2017/0305298 A1* | 10/2017 | Takeshima | H02M 3/1588 |
| 2019/0315296 A1* | 10/2019 | Elghrawi | G05B 19/042 |
| 2021/0249949 A1* | 8/2021 | Leroy | H02J 1/14 |

* cited by examiner

POWER SUPPLY

CROSS-REFERENCE TO RELATED APPLICATION

The present application claims priority to U.S. Provisional Application No. 63/035,293, filed Jun. 5, 2020, titled POWER SUPPLY, the entire content of which is incorporated by reference.

FIELD OF INVENTION

The present invention relates to a motor vehicle topology that includes a stop-start system, and, in particular, a stop-start system with a DC/AC converter and an auxiliary DC/DC converter.

BACKGROUND OF THE INVENTION

FIG. 1 shows the topology 10 of a conventional motor vehicle, which includes an electrical DC power source (e.g. a 12V battery), an alternator 14, a starter motor 16, and a load 18. This topology may include an inverter 20 that supplies AC electrical power via an outlet.

Some automobiles are equipped with a stop-start system. A stop-start system (or start-stop) system automatically shuts down and restarts the engine to reduce the engine idling, needless fuel consumption, and emissions at, for example, a stop light or, for example, in traffic jams. A stop-start system may be present in a hybrid electric vehicle or another type of vehicle.

FIG. 2 shows another conventional topology 22 for a motor vehicle that includes a stop-start system 24. As is known, during the re-start part of the stop-start cycle, there may be a voltage drop in the power supply line, which may affect the critical loads adversely. To provide the necessary voltage support (i.e. to maintain the voltage at a proper level) during the voltage drop, a stop-start DC-DC converter 26 is provided to supply the needed voltage to the critical loads 27 such as the exterior lights, the interior lights, the radio, the dashboard, among others, that need to have power during the cranking event of the stop-start.

FIG. 3 shows another variation 22' of a conventional motor vehicle (e.g. a hybrid car) with a stop-start system 24 that includes a re-chargeable battery 28.

SUMMARY OF THE INVENTION

An objective of the present invention is to simplify the topology of a motor vehicle that includes a stop-start system.

Another objective is to simplify the vehicle architecture from a system level point of view, to reduce the weight, to reduce the harness and the connector count, and to communize the packaging between devices.

A power supply is disclosed herein that achieves the objectives of the present invention.

The power supply disclosed herein is an integrated module, which includes in a common, shared module housing, a start-stop DC/DC converter, a DC/AC converter, an auxiliary DC/DC converter, a DC input port connected to the start-stop DC/DC converter and connectable to a DC power source, a DC output port connected to the start-stop DC/DC converter to supply DC to critical loads of a motor vehicle, an AC output port connected to the DC/AC converter to supply AC to an external component, and another DC output port connected to the auxiliary DC/DC converter to supply DC to another external component.

The external component may be an AC outlet, and the AC output port is connectable to the AC outlet to supply AC at 120 or 220 volts to the AC outlet.

The another external component may be a USB port, and the another DC output port is connectable to the USB port to supply DC in the range 5.5 to 16 volts to the USB port.

The power supply may include an EMI filter located inside the module housing and connected to the DC input port and the start-stop DC/DC converter.

The power supply may include a surge protection circuit located inside the module housing and connected to the DC input port and the start-stop DC/DC converter.

The power supply may include a reverse polarity protection located inside the module housing and connected to the DC input port and the start-stop DC/DC converter.

The power supply may include a bypass switching relay circuit located inside of the module housing to connect the DC power source directly to the DC output port bypassing the DC/DC converter.

The power supply may include an overcurrent protection circuit located inside of the module housing and connected to the DC output port and the start-stop DC/DC converter.

In the power supply, the start-stop DC/DC converter is a boost converter.

The boost converter may include a bypass switch relay to bypass the DC/DC converter and connect the DC power source to the DC output port directly.

An automotive topology according to the present invention includes a DC power source; loads; critical load; and an integrated module, which includes in a common, shared module housing, a start-stop DC/DC converter, a DC/AC converter, an auxiliary DC/DC converter, a DC input port connected to the start-stop DC/DC converter and connected to the DC power source, a DC output port connected to the start-stop DC/DC converter to supply DC to the critical loads, an AC output port connected to the DC/AC converter to supply AC to an external component, and another DC output port connected to the auxiliary DC/DC converter to supply DC to another external component.

The external component may be an AC outlet, and the AC output port is connected to the AC outlet to supply AC at 120 or 220 volts to the AC outlet.

The another external component may be a USB port, and the another DC output port is connected to the USB port to supply DC in the range 5.5 to 16 volts to the USB port.

The automotive topology may further include an EMI filter connected between the DC input port and the DC power source.

The automotive topology may further include a surge protection circuit connected between the DC input port and the DC power source.

The automotive topology may further include a reverse polarity protection connected between the DC input port and the DC power source.

The automotive topology may further include a bypass switching relay circuit located to connect the DC power source directly to the DC output port bypassing the DC/DC converter.

The automotive topology may further include an overcurrent protection circuit connected to the DC output port.

The start-stop DC/DC converter in the automotive topology may be a boost converter.

The boost converter of the automotive topology may include a bypass switch relay to bypass the DC/DC converter and connect the DC power source to the DC output port directly.

DETAILED DESCRIPTION

Figure 1:
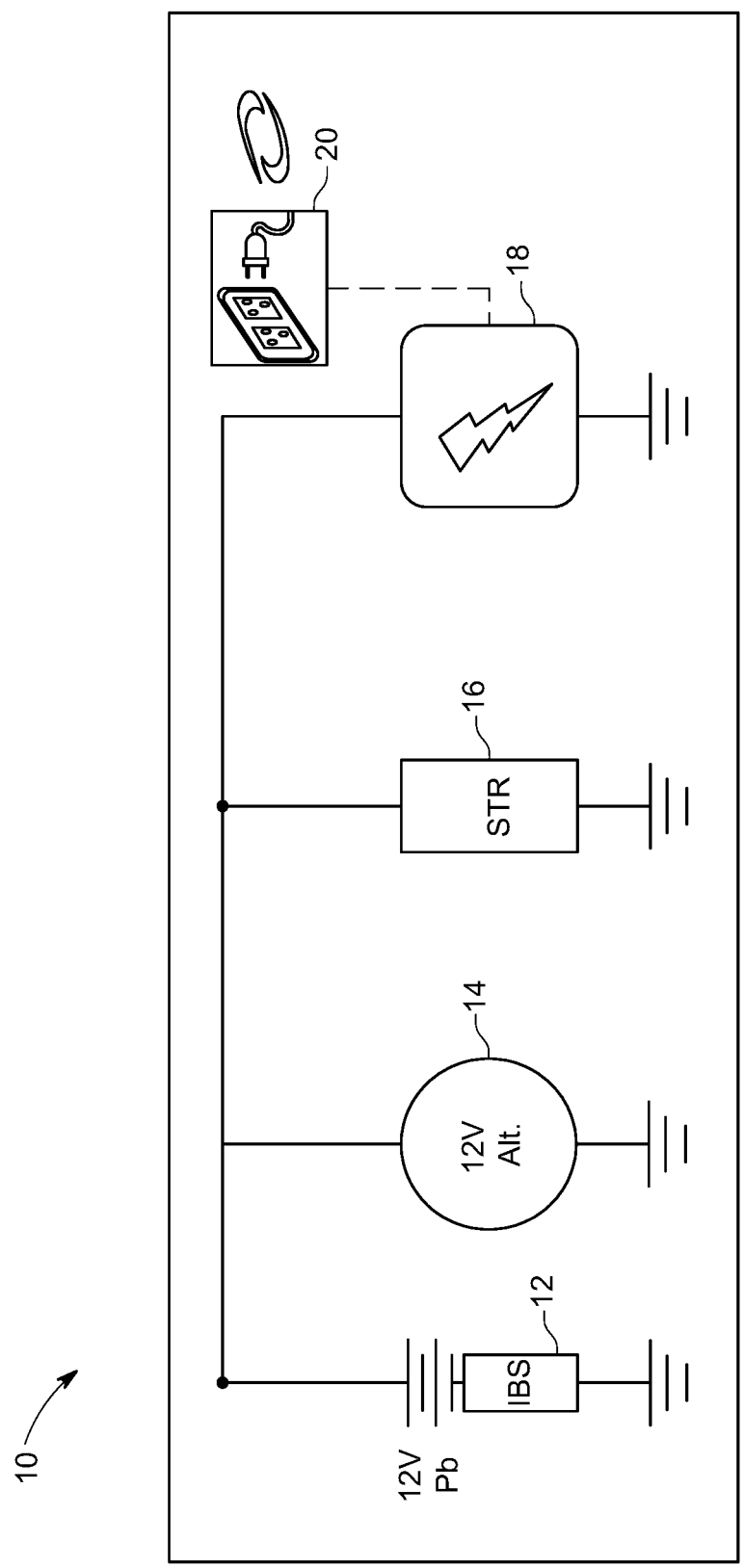
FIG. 1 shows a conventional topology for a motor vehicle.
Figure 2:
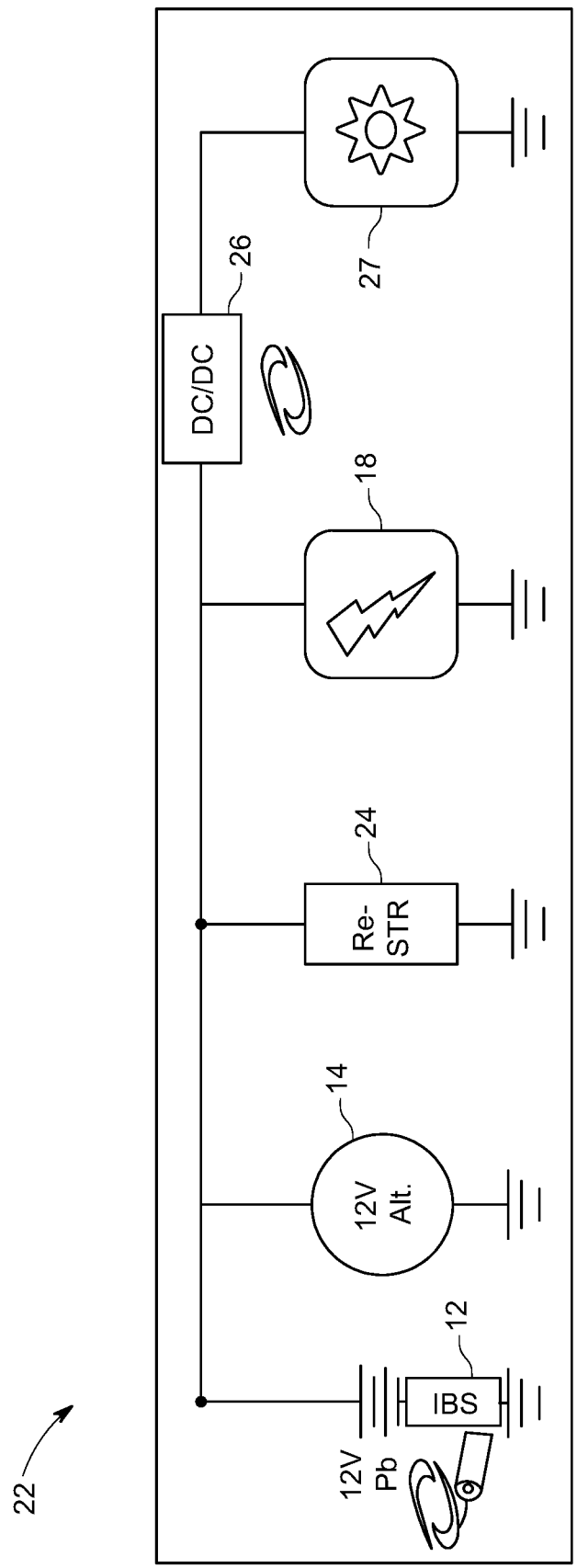
FIG. 2 shows another conventional topology for a motor vehicle with a stop-start system.
Figure 3:
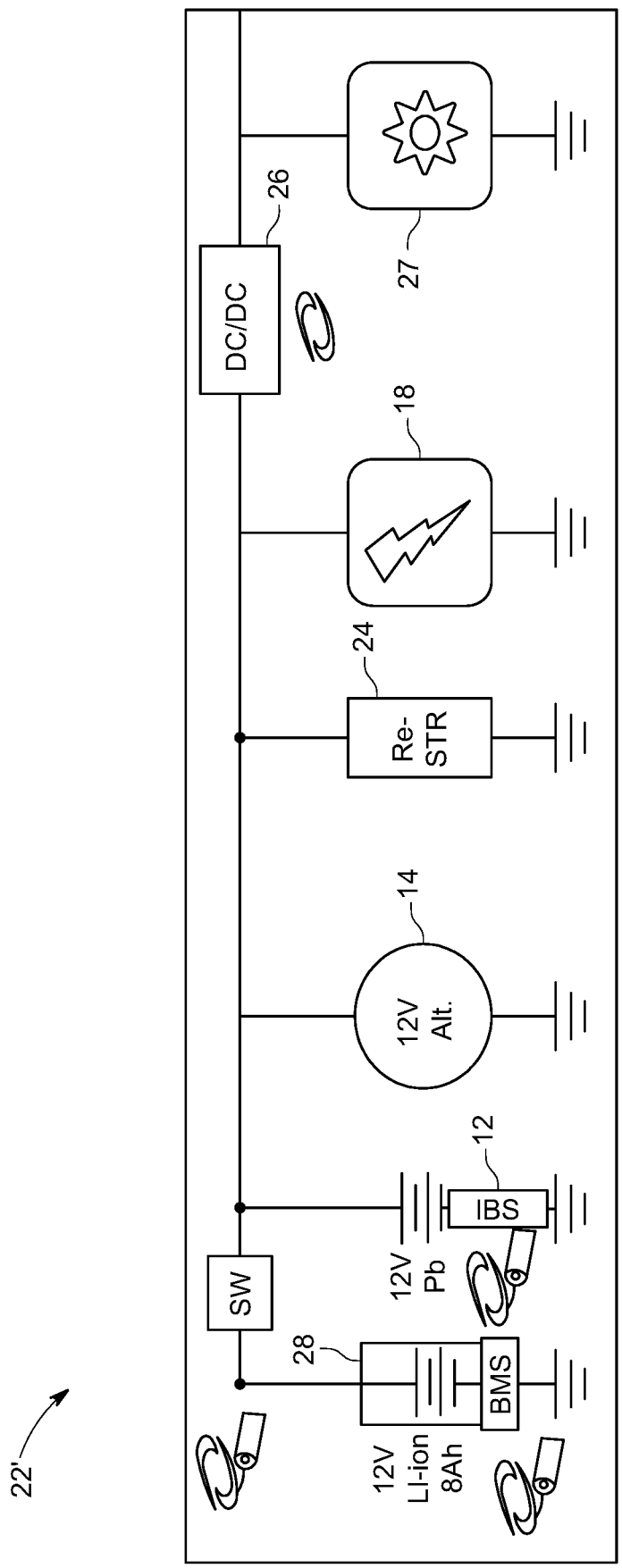
FIG. 3 shows another conventional topology for a motor vehicle with a stop-start system.
Figure 4:
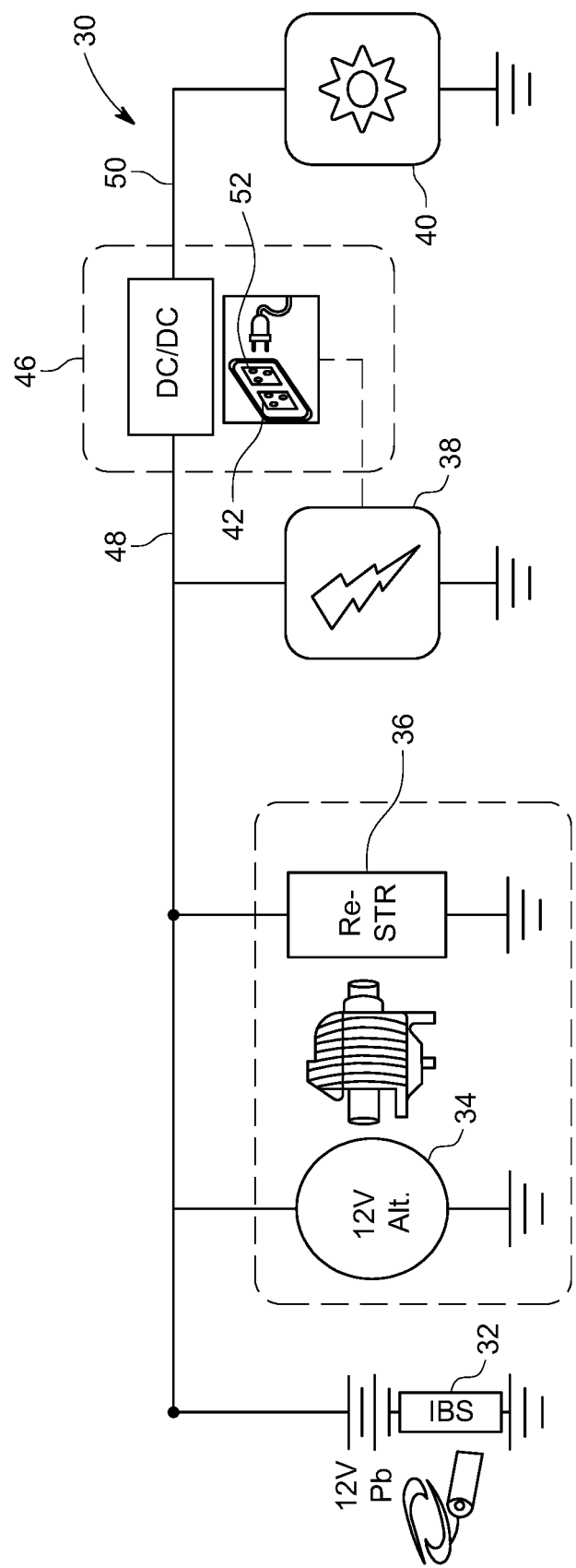
FIG. 4 shows a topology for a motor vehicle that includes a stop-start system according to the present invention.

FIG. 4 shows the topology (system) 30 of a motor vehicle enabled with a power supply according to the present invention.

The topology 30 may include an electrical power source 32, which may be a DC power source, such as a 12V automotive battery, an alternator 34, a start/restarter motor 36, loads 38, and critical loads 40. The alternator 34 and the starter/restarter motor 36 (which is part of a stop-start system) may be replaced with an electrical machine that functions as a starter generator.

Figure 5:
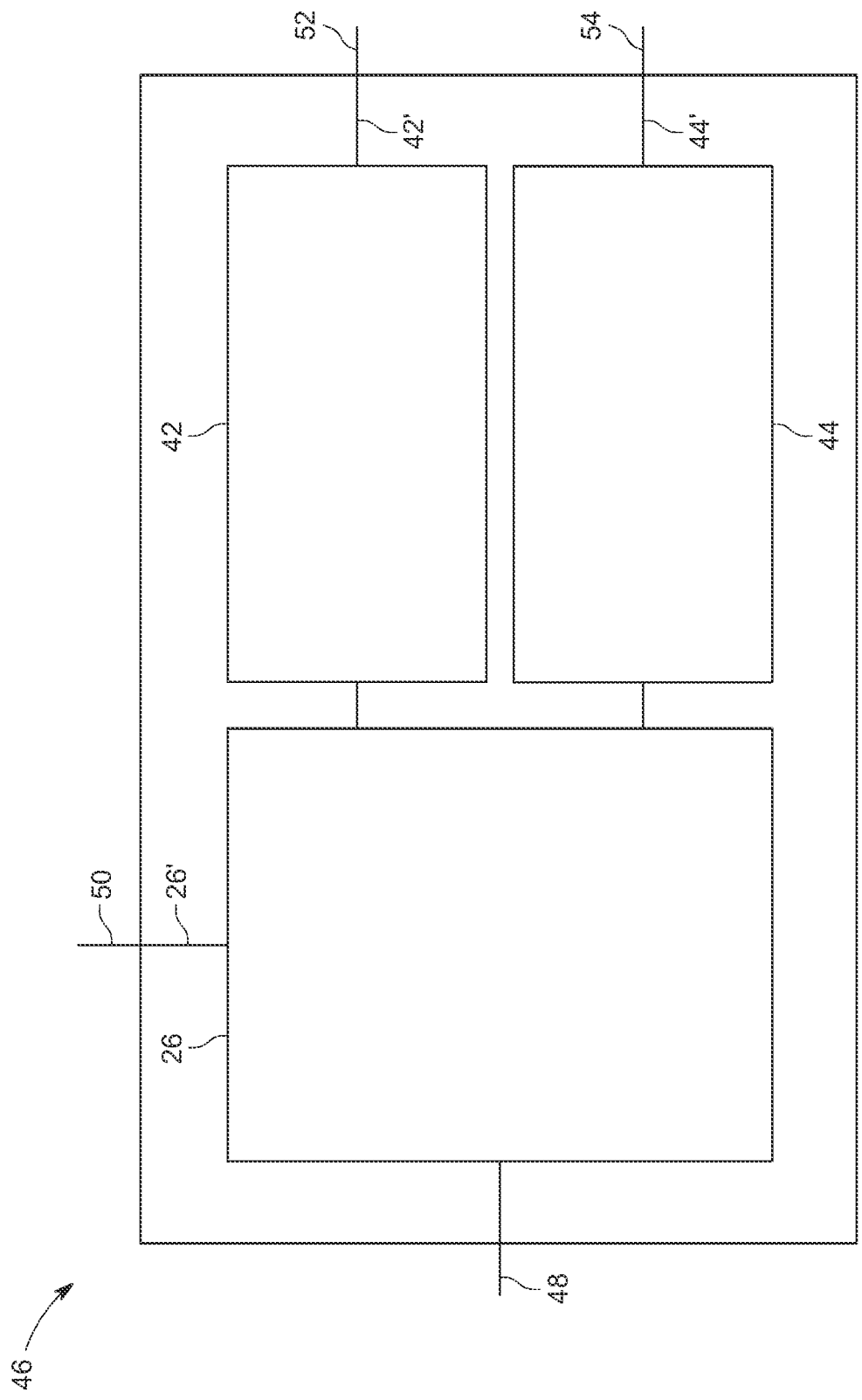
FIG. 5 illustrates an embodiment of a power supply according to the present invention.

As seen in FIG. 5, a power supply according to the present invention is an integrated module 46 that includes at least a start-stop DC/DC converter 26, which may be a boost converter, and a DC/AC converter (inverter) 42 co-packaged in a common (shared) module housing having at least a DC input port 48 to receive power from a DC power source (e.g. a battery), a DC output port 50 for connection to supply power to the critical loads 40, and an AC output port 52. The DC/DC converter 26 functions as a start/stop DC/DC converter to supply the appropriate voltage (for example, from 5.5 to 16 VDC input to 12 VDC output) as described above. The DC/AC converter 42 converts the DC voltage (for example, 12 VDC input to 120 or 220 VAC output).

Referring to FIG. 5, a power supply according to one embodiment of the present invention may include a stop-start DC/DC converter 26 that can provide voltage support to critical loads 40, which is electrically coupled to a DC/AC converter 42 and an auxiliary DC/DC converter 44. Thus, there may be an output 26' from the stop-start DC/DC converter 26 to support the critical loads 40 during the start event part of the stop-start cycle as described earlier, an output 42' for the DC/AC converter 42, which may be connected to an AC outlet 52, and an output 44' from the auxiliary DC/DC converter 44, which may be connected to another outlet (e.g. a USB port) 54.

According to an embodiment of the present invention, the power supply may be an integrated power supply module 46 that includes the stop-start DC/DC converter 26 as one block, the DC/AC converter 42 as another block, and the auxiliary DC/DC converter 44 as a further block, all co-packaged in one package (that is in one module housing), and the package (module) having at least one input port 48 for connection to a power source (for example, the battery 32), a first DC output port 50 directly connected to the stop-start DC/DC converter 26 block for connection and supply of DC power to critical loads 40 from the stop-start DC/DC converter 26 block of the module 48, an AC output port (outlet) 52 for disconnectable/reconnectable connection and supply of power to AC loads, and an auxiliary DC output port (outlet) 54 for disconnectable/reconnectable connection and supply of DC power to a DC load.

The AC output port 52 may supply AC power at 60 Hz. The AC output port is connectable to the AC outlet to supply AC output in any range from 90V to 240V to the AC outlet.

The auxiliary DC output port 54 may supply, for example, 400 W of DC power at, for example, 12VDC (regulated) to, for example, mobile devices (e.g. cell phones, laptops) via a conventional USB port.

The DC/AC converter 42 and the auxiliary DC/DC converter 44 may receive power from the DC/DC converter 26 or receive power directly from the battery 32.

Two additional output ports 52, 54 will simplify the electrical system of a motor vehicle.

Figure 6:
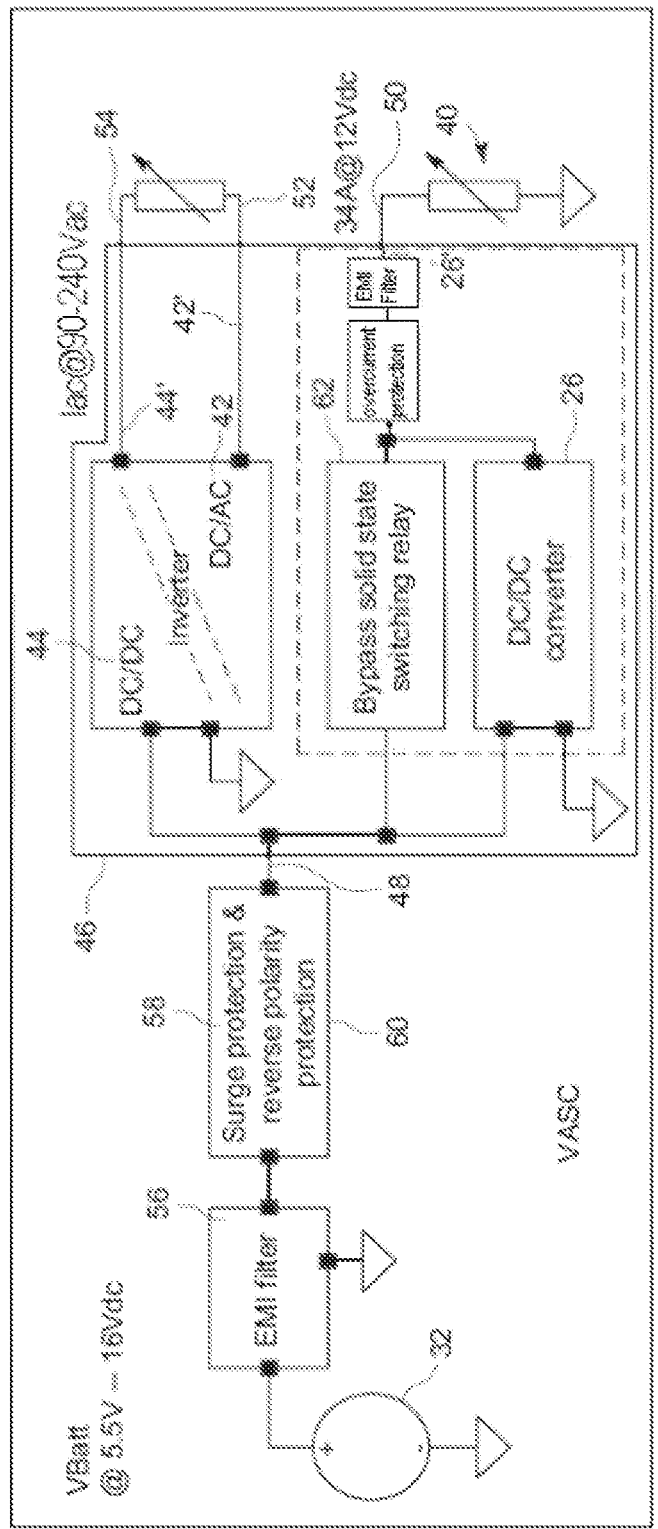
FIG. 6 shows another embodiment of a power supply according to the present invention.

FIG. 6, in which like numerals indicate like features, shows another embodiment of a module 46 according to the present invention.

The module 46 includes a DC power input port 48 to receive DC input power from the automotive battery 32. Thus, for example, the module 46 may receive DC power from a 12V automotive battery, or any other automotive battery. An EMI (electromagnetic interference) filter 56, a surge protection circuit 58, and a reverse polarity protection circuit 60 may be connected between the input port 48 of the module 46 and the battery 32. In a variation, the EMI filter 56, the surge protection circuit 58, and the reverse polarity protection 60 may reside inside the module housing of module 46 with the DC/AC converter (inverter) 42, the auxiliary DC/DC converter 44, and the start/stop DC/DC converter 26, in which case the input port 48 of the module 46 will be located between the battery 32 and the EMI filter 56, the surge protection circuit 58, and the reverse polarity protection circuit 60.

The module 46 may further include a bypass solid state switching relay circuit 62, which may or may not be co-packaged with the DC/DC converter 26. The purpose of the bypass solid state switching relay circuit 62 is to connect the battery 32 directly to the load 40 if the DC/DC converter 26 is not needed to boost the voltage.

Optionally, an overcurrent protection circuit 64 may be provided between the DC output port 50 and the output of the DC/DC converter 26 and, when present, the output of the bypass solid state switching relay 62. An EMI filter may be optionally added after the overcurrent protection circuit 64 and before the DC output port 50. That is, the EMI filter may be located inside or outside of the common housing, and added in series between the output of the overcurrent protection circuit 64 and the DC output port 50.

Figure 7:
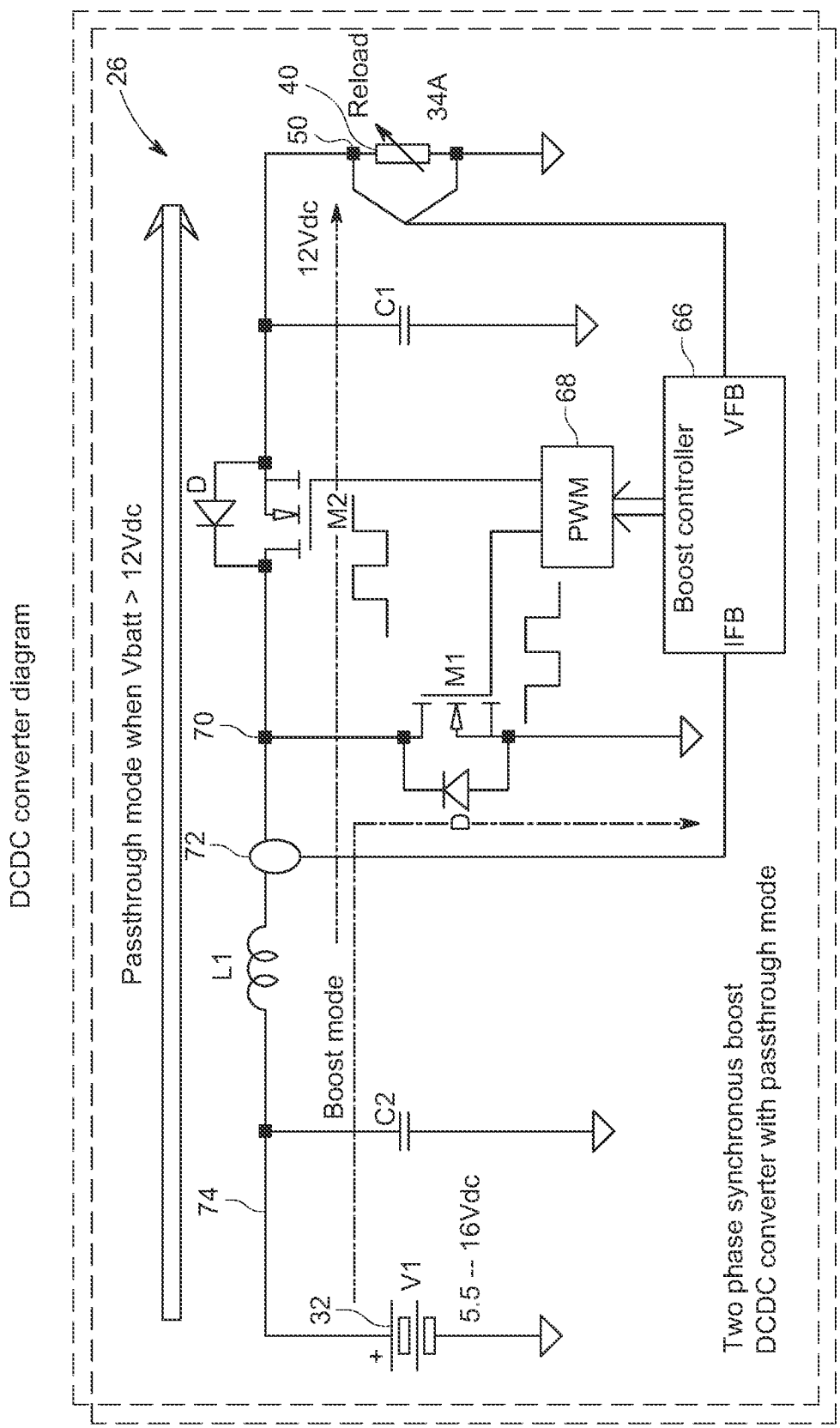
FIG. 7 shows a circuit diagram of a DC/DC boost converter with pass through capability for use in a power supply according to a variation of the embodiment shown in FIG. 6.

FIG. 7 shows an example of a DC/DC boost converter circuit with a pass through mode (enabled with a bypass solid state switching relay mode) that can be used as the start/stop DC/DC converter 26 in a module 46 according to the present invention. As shown, in the boost mode, the boost controller 66, which controls a PWM (pulse width modulator) 68 to operate a DC/DC voltage boost converter in order to deliver boosted voltage (for example, 12 VDC) to the DC output port 50 of the module 46. In the pass through mode, one of the switches M2 of the boost converter is closed to directly connect the battery 32 to the DC output port 50.

More specifically, DC current is supplied from the battery 32 to the inductor L1 to charge the inductor L The boost controller 66 is connected to sense the status of the charge in the inductor L1 and operates the PWM 68, which in turn operates the switch M1 and/or the switch M2 in order to charge the capacitor C1 to the desired voltage (for example, 12 VDC). The switches M1 and M2 are connected in series in a half bridge configuration. The inductor L1 is connected to supply current to the half bridge at the center tap 70 (located between switches M1 and M2) thereof. The boost controller 66 is connected at the output 72 of the inductor L1. A smoothing cap C2 may also be provided to reduce ripples in the input line 74 from the battery 32 to the inductor L1. The switches M1 and M2 may be mosfets, IGBTs or the like switches that are electronically controllable by gate control signals supplied by PWM 68.

It should be noted that the inductor L1 and the smoothing capacitor C2 may be located outside of the module 46, and connected to the input port 48 from outside of the module 46 or may located inside of the module 46 and connected to the input port 48 inside of the module 46.

Figure 8:
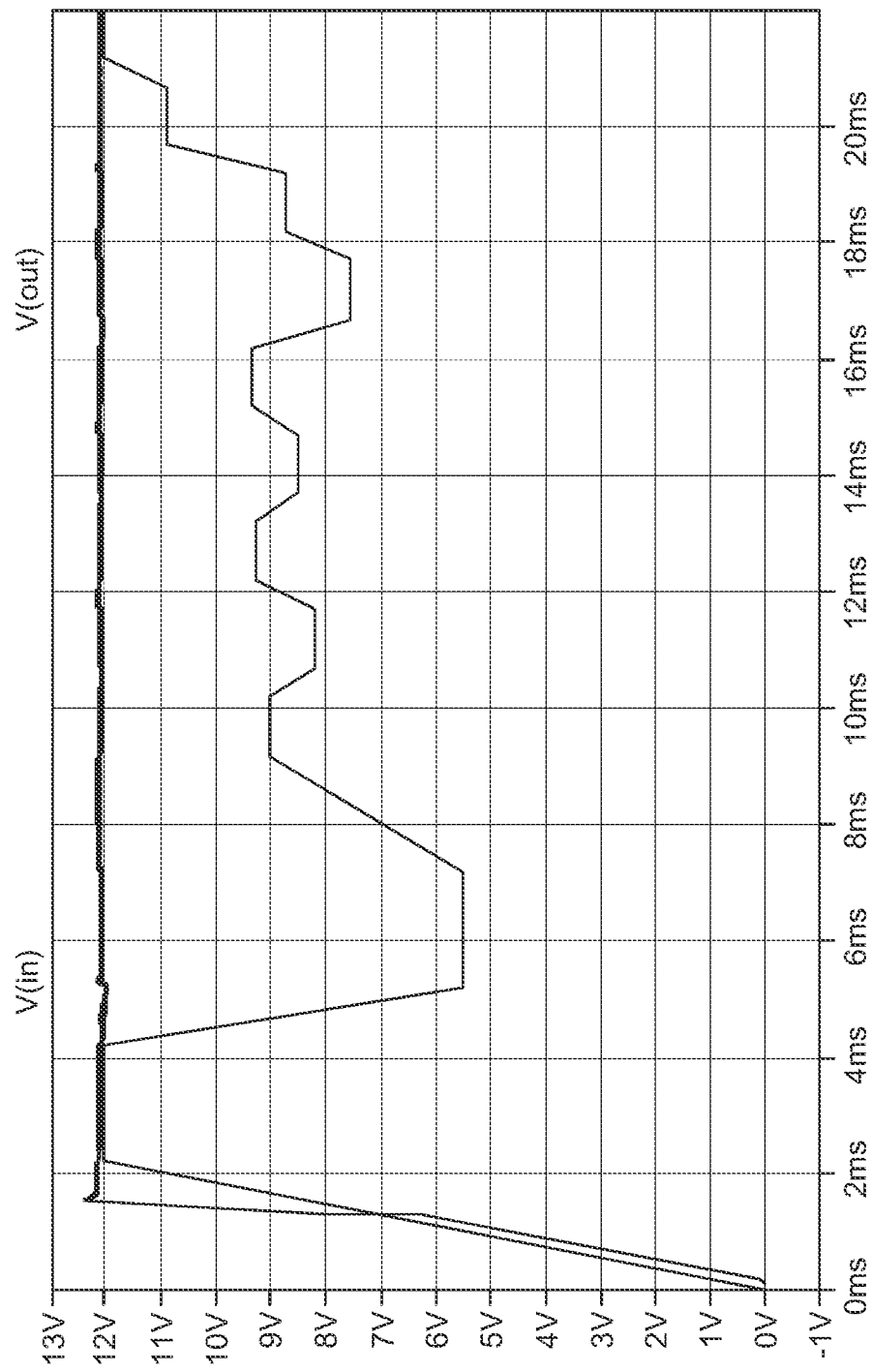
FIG. 8 shows simulation results for a DC/DC converter used in a power supply according to the present invention.

FIG. 8 shows the simulated results of the operation of a DC/DC converter used in a module according to the present invention.

A module 46 according to the present invention may be capable of providing up to 800 W of power. Up to 400 W of power may be supplied via the AC output port 52. Up to 400 W of power may be supplied via the stop-start DC output port 50 to the critical loads 40.

A topology that includes a power supply according to the present invention allows for higher efficiency, which may potentially eliminate the use of a fan or, potentially allow the use of a small/low noise fan.

A power supply module according to the present invention may support stop-start without an additional boost converter.

A regulated high voltage bus, when present in a topology according to the present invention, will allow for a reduced total harmonic distortion and limited output peak voltage because the output wave form shape is very stable, which will lead to improved compatibility with consumer loads.

The topology can be converted to a true sine wave if needed with minimal modifications.

The soft switching for DC/DC should also allow for better EMC performance.

If provided, a 9 mm terminal on a 12V input connector may allow for more flexibility for module placement in the vehicle (can be further away without a voltage drop since terminal can accommodate a larger wire).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power supply, comprising: an integrated module, which includes in a common, shared module housing, a start-stop DC/DC converter; a DC/AC converter; an auxiliary DC/DC converter, which bypasses stop/start during non-stop/start operation; a DC input port connected to the start-stop DC/DC converter, the DC/AC converter, and the auxiliary DC/DC converter; a DC output port connected to the start-stop DC/DC converter to supply DC to critical loads of a motor vehicle, even during vehicle OFF mode; and an AC output port connected to the DC/AC converter to supply AC to an external component.

2. The power supply of claim 1, wherein the external component is an AC outlet, and the AC output port is connectable to the AC outlet to supply AC output in any range from 90V to 240V to the AC outlet.

3. The power supply of claim 1, wherein another external component is a USB port, and the another DC output port is connectable to the USB port to supply DC in the range 5.5 to 16 volts to the USB port.

4. The power supply of claim 1, further comprising an EMI filter located inside the module housing and connected to the DC input port and the start-stop DC/DC converter.

5. The power supply of claim 1, further comprising an EMI filter located inside the module housing and connected to the DC output port and the start-stop DC/DC converter.

6. The power supply of claim 1, further comprising a surge protection circuit located inside the module housing and connected to the DC input port.

7. The power supply of claim 1, further comprising a reverse polarity protection located inside the module housing and connected to the DC input port.

8. The power supply of claim 1, further comprising a bypass switching relay circuit located inside of the module housing to connect the DC power source directly to the DC output port bypassing the DC/DC converter.

9. The power supply of claim 1, further comprising an overcurrent protection circuit located inside of the module housing and connected to the DC output port and the start-stop DC/DC converter.

10. The power supply of claim 1, wherein the start-stop DC/DC converter is a boost converter.

11. The power supply of claim 10, wherein the boost converter includes a bypass switch relay to bypass the DC/DC converter and connect the DC power source to the DC output port directly.

12. A stop/start automotive topology, comprising:
a DC power source;
loads;
critical loads; and
an integrated module, which includes in a common, shared module housing, a start-stop DC/DC converter, a DC/AC converter, an auxiliary DC/DC converter, which bypasses stop/start during non-stop/start operation, a DC input port connected to the start-stop DC/DC converter, the DC/AC converter, and the auxiliary DC/DC converter, a DC output port connected to the start-stop DC/DC converter to supply DC to the critical loads, even during vehicle OFF mode, and an AC output port connected to the DC/AC converter to supply AC to an external component.

13. The automotive topology of claim 12, wherein the external component is an AC outlet, and the AC output port is connectable to the AC outlet to supply AC output in any range from 90V to 240V to the AC outlet.

14. The automotive topology of claim 12, wherein the another external component is a USB port, and the another DC output port is connected to the USB port to supply DC in the range 5.5 to 16 volts to the USB port.

15. The automotive topology of claim 12, further comprising an EMI filter located inside the module housing and connected to the DC input port and the start-stop DC/DC converter.

16. The automotive topology of claim 12, further comprising an EMI filter located inside the module housing and connected to the DC output port and the start-stop DC/DC converter.

17. The automotive topology of claim 12, further comprising a surge protection circuit connected between the DC input port and the DC power source.

18. The automotive topology of claim 12, further comprising a reverse polarity protection connected between the DC input port and the DC power source.

19. The automotive topology of claim 12, further comprising a bypass switching relay circuit located to connect the DC power source directly to the DC output port bypassing the DC/DC converter.

20. The automotive topology of claim 12, further comprising an overcurrent protection circuit connected to the DC output port.

21. The automotive topology of claim 12, wherein the start-stop DC/DC converter is a boost converter.

22. The automotive topology of claim 12, wherein the boost converter includes a bypass switch relay to bypass the DC/DC converter and connect the DC power source to the DC output port directly.

\* \* \* \* \*